US012669949B2

(12) United States Patent
Martin et al.

(10) Patent No.: US 12,669,949 B2
(45) Date of Patent: Jun. 30, 2026

(54) SERVICE LEVEL PORT OVERSUBSCRIPTION

(71) Applicant: Dell Products L.P., Hopkinton, MA (US)

(72) Inventors: Owen Martin, Hopedale, MA (US); Peter Linden, Boston, MA (US); Michael Scharland, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 298 days.

(21) Appl. No.: 18/614,830

(22) Filed: Mar. 25, 2024

(65) Prior Publication Data

US 2025/0298526 A1 Sep. 25, 2025

(51) Int. Cl.
*G06F 3/06* (2006.01)

(52) U.S. Cl.
CPC .......... *G06F 3/0635* (2013.01); *G06F 3/0617* (2013.01); *G06F 3/067* (2013.01)

(58) Field of Classification Search
CPC ................................ H04L 12/28; H04L 12/50
USPC ......................... 370/329, 401, 402, 403, 405
See application file for complete search history.

(56) References Cited

U.S. PATENT DOCUMENTS

2022/0129173 A1* 4/2022 Martin ..................... G06F 3/061
2023/0325285 A1* 10/2023 O'Connor .......... G06F 11/1448

* cited by examiner

*Primary Examiner* — Dang T Ton
(74) *Attorney, Agent, or Firm* — Anderson Gorecki LLP

(57) ABSTRACT

A storage system includes at least one oversubscription-protected storage group and at least one non-protected storage group. Some or all of the primary path ports of the non-protected storage group are secondary path ports for the protected storage group. The secondary port paths are normally inactive for the protected storage group. When aggregate bandwidth on the primary port paths of the protected storage group reaches a threshold condition or is forecasted to reach the threshold condition, the secondary port paths are activated for the protected storage group. While the secondary port paths are activated for the protected storage group, both the protected storage group and the non-protected storage group are accessible via the shared ports. Access to the protected storage group and the non-protected storage group via the shared ports may be bandwidth-limited such that sharing in a predetermined ratio is ensured.

20 Claims, 8 Drawing Sheets

CONFIGURE SERVICE LEVEL PORT MAPPING 800

CONFIGURE OVERSUBSCRIPTION BANDWIDTH BUDGETS 802

CONFIGURE OVERSUBSCRIPTION TRIGGER THRESHOLD 804

MONITOR UTILIZATION OF PRIMARY PORTS OF STORAGE OBJECTS IN OVERSUBSCRIPTION-PROTECTED STORAGE GROUPS 806

FORECAST FUTURE UTILIZATION OF PRIMARY PORTS OF STORAGE OBJECTS IN OVERSUBSCRIPTION-PROTECTED STORAGE GROUPS 808

CURRENT UTILIZATION OF OVERSUBSCRIPTION-PROTECTED STORAGE OBJECT PRIMARY PORTS EXCEEDS THRESHOLD? 810 — No

Yes

ACTIVATE SECONDARY PORTS FOR OVERSUBSCRIPTION-PROTECTED STORAGE OBJECT FOR PREDETERMINED TIME INTERVAL/CONDITIONS 812

FORECASTED UTILIZATION OF OVERSUBSCRIPTION-PROTECTED STORAGE OBJECT PRIMARY PORTS WILL EXCEED THRESHOLD? 814 — No

Yes

ACTIVATE SECONDARY PORTS FOR OVERSUBSCRIPTION-PROTECTED STORAGE OBJECT FOR FORECASTED TIME WINDOW 816

| SG Service Level Port Mapping | | | | Bandwidth Budget | | |
|---|---|---|---|---|---|---|
| Diamond | Gold | Bronze | | Diamond | Gold | Bronze |
| Primary | | | Port 1 | 100% | | |
| Primary | | | Port 2 | 100% | | |
| Primary | | | Port 3 | 100% | | |
| Primary | | | Port 4 | 100% | | |
| Secondary | Primary | | Port 5 | 25% | 75% | |
| Secondary | Primary | | Port 6 | 25% | 75% | |
| Secondary | | Primary | Port 7 | 50% | | 50% |
| Secondary | | Primary | Port 8 | 50% | | 50% |

SERVICE LEVEL PORT OVERSUBSCRIPTION

TECHNICAL FIELD

The subject matter of this disclosure is generally related to electronic data storage systems.

BACKGROUND

A data center can include a variety of high-capacity, multi-user data storage systems such as storage area networks (SANs) with storage arrays for maintaining storage objects that are contemporaneously accessed by multiple instances of different host applications running on clusters of host servers. Examples of host applications include databases and software for email, sales, inventory, accounting, manufacturing, and engineering. Performance-differentiated levels of storage service can be provided to the host applications such that a first host application that requires greater input-output operations per second (IOPS), lower IO latency, or is simply deemed to be more important than a second host application is provided with greater IOPS, lower IO latency, or both relative to the second host application.

SUMMARY

In accordance with some embodiments, a method comprises: configuring port mappings that mask each of a plurality of performance-differentiated storage groups to a different set of front-end ports of a storage system, including mapping an oversubscription-protected storage group to primary path ports and secondary path ports and mapping a non-protected storage group to only primary path ports, the mapped ports including at least one oversubscription port that is in a primary path of the non-protected storage group and in a secondary path of the oversubscription-protected storage group; monitoring aggregate utilization of the primary path ports mapped to the oversubscription-protected storage group while the secondary path ports, including the oversubscription port, are in an inactive state such that the oversubscription port is not usable to access the oversubscription-protected storage group and is usable to access the non-protected storage group; and responsive to aggregate utilization of the primary path ports mapped to the oversubscription-protected storage group satisfying a trigger condition, switching the secondary path ports, including the oversubscription port, from the inactive state to an active state such that the oversubscription port is usable to access the oversubscription-protected storage group and the non-protected storage group.

In accordance with some embodiments, an apparatus comprises: a plurality of storage directors that manage access to data stored on a plurality of managed drives used to create a plurality of performance-differentiated storage groups; port mappings that mask each performance-differentiated storage group to a different set of front-end ports of the storage directors, including mapping an oversubscription-protected storage group to primary path ports and secondary path ports and mapping a non-protected storage group to only primary path ports, the mapped ports including at least one oversubscription port that is in a primary path of the non-protected storage group and in a secondary path of the oversubscription-protected storage group; the storage directors configured to: monitor aggregate utilization of the primary path ports mapped to the oversubscription-protected storage group while the secondary path ports, including the oversubscription port, are in an inactive state such that the oversubscription port is not usable to access the oversubscription-protected storage group and is usable to access the non-protected storage group; and responsive to aggregate utilization of the primary path ports mapped to the oversubscription-protected storage group satisfying a trigger condition, switch the secondary path ports, including the oversubscription port, from the inactive state to an active state such that the oversubscription port is usable to access the oversubscription-protected storage group and the non-protected storage group.

In accordance with some embodiments, a non-transitory computer-readable storage medium stores instructions that are executed by a storage array to perform a method comprising: configuring port mappings that mask each of a plurality of performance-differentiated storage groups to a different set of front-end ports of a storage system, including mapping an oversubscription-protected storage group to primary path ports and secondary path ports and mapping a non-protected storage group to only primary path ports, the mapped ports including at least one oversubscription port that is in a primary path of the non-protected storage group and in a secondary path of the oversubscription-protected storage group; monitoring aggregate utilization of the primary path ports mapped to the oversubscription-protected storage group while the secondary path ports, including the oversubscription port, are in an inactive state such that the oversubscription port is not usable to access the oversubscription-protected storage group and is usable to access the non-protected storage group; and responsive to aggregate utilization of the primary path ports mapped to the oversubscription-protected storage group satisfying a trigger condition, switching the secondary path ports, including the oversubscription port, from the inactive state to an active state such that the oversubscription port is usable to access the oversubscription-protected storage group and the non-protected storage group.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
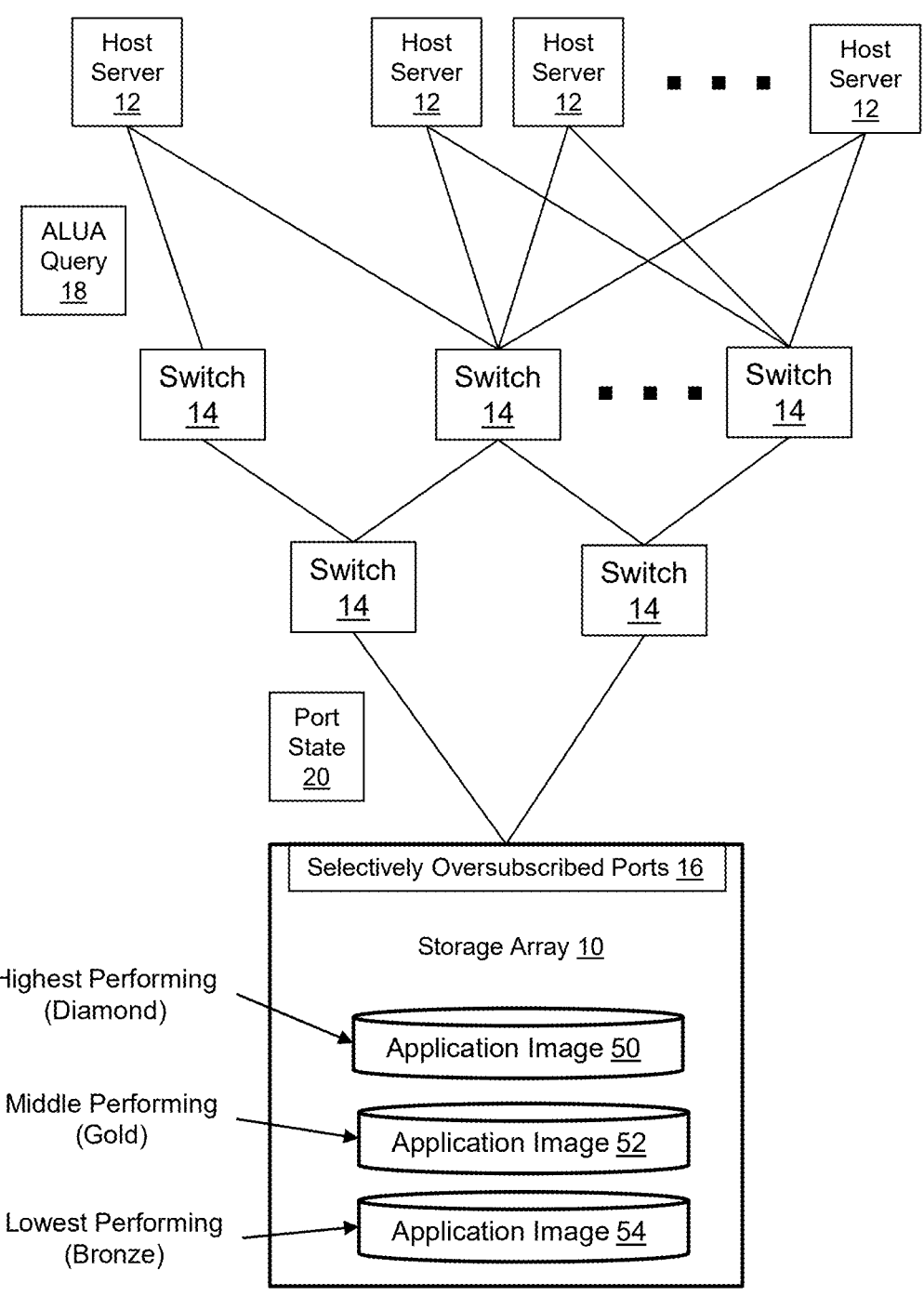
FIG. 1 illustrates a simplified data center in which a storage array is configured with selectively oversubscribed ports for supporting performance-differentiated service levels.

FIG. 1 illustrates a simplified data center in which a storage array 10 is configured with front-end ports 16 that are selectively oversubscribed to support performance-differentiated service levels. Host servers 12 communicate with the storage array 10 to read and write data via a network of switches 14. The storage array, which is one type of storage node, maintains multiple application images 50, 52, 54 that are accessed by instances of host applications running on host servers 12. Each host application image is uniquely associated with a single host application and may contain all the data generated and used by all instances of that host application. In order to provide performance-differentiated storage services to individual host applications, each application image is assigned a performance level that is defined in terms of metrics such as maximum IO latency, minimum IOPS capable of being processed, or both, for example, and without limitation. In the illustrated example, application image 50 is assigned the highest performing service level (hereafter "diamond"), application image 52 is assigned a middle performing service level (hereafter "gold"), and application image 54 is assigned the lowest performing service level (hereafter "bronze"). Different service levels may use different types of storage media (disk drives) characterized by different access latency. Further, service levels may have differentiated allocations or prioritized access to memory and CPU cycles. Further, service levels are differentiated by allocation of the front-end ports via which the storage array communicates with the host servers, as will be explained in greater detail below.

Although different host applications may run simultaneously on a single host server, not all host applications are necessarily able to access their respective host application image via all front-end ports through which the host server is connected to the storage array. The storage array causes each application image to be accessible via only a subset of those ports as defined in a masking view. The highest performing application image may be accessible through (masked to) more ports than the other, lower performing application images. Further, the highest performing application image may be accessible through ports via which the other application images are not accessible. Individual ports have a maximum bandwidth rating, e.g., in terms of data transfer, bit rate, or throughput. When the ports associated with an oversubscription-supported application image, e.g., diamond-level application image 50, become bandwidth-constrained, some or all of the ports associated with other application images are temporarily oversubscribed by enabling access to the diamond-level application image 50 via those ports. In this context, bandwidth-constrained can mean that the performance metric that defines the service level cannot be satisfied with the bandwidth available from the set of ports ordinarily masked to the oversubscription-protected application image, although a threshold at which oversubscription is triggered may be at, below, or above that performance metric. Port oversubscription temporarily transfers some front-end port bandwidth capacity between application images, which can help to maintain service level compliance of the oversubscription-supported application image.

Communications that control port oversubscription may be exchanged using the Asymmetric Logical Unit Access (ALUA) protocol of Small Computer System Interface (SCSI), also known as SCSI Target Port Groups or Target Port Group Support. ALUA is an industry standard protocol for identifying optimized paths between a storage system and a host server. ALUA enables the host-initiator to send queries 18 to the storage-target about path attributes, such as primary path and secondary path. It also allows the target to communicate events and port state 20 back to the initiator. As will be explained below, port oversubscription can be enabled and disabled by changing port state.

Figure 2:
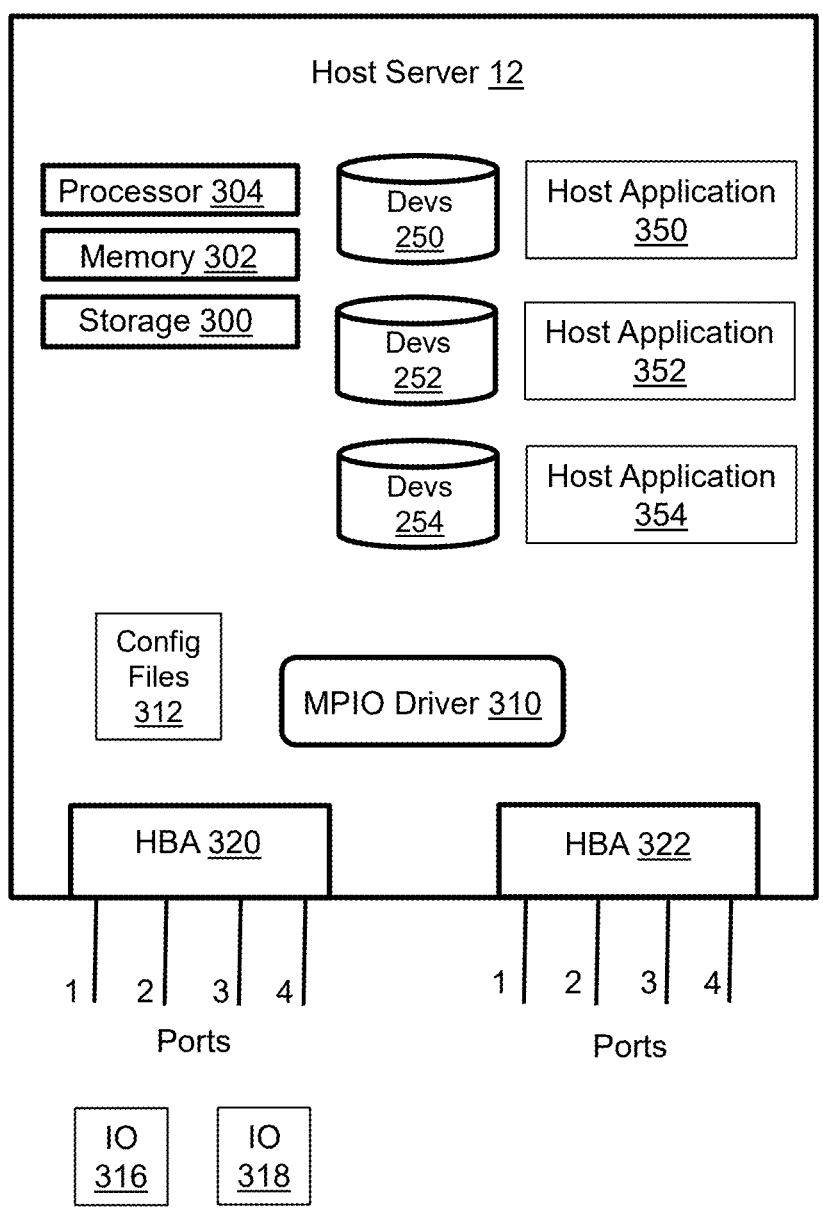
FIG. 2 illustrates a host server in greater detail.

FIG. 2 illustrates one of the host servers 12 in greater detail. Each host server includes volatile memory 302, non-volatile storage 300, one or more tangible processors 304 that support instances of host applications, a Multi-Path Input-Output (MPIO) driver 310 running in the host kernel, and a plurality of host bus adapter (HBA) 320 Network Interface Cards (NICs), each with multiple ports 1-4. Examples of host applications might include, but are not limited to, databases and software for email, accounting, sales, inventory control, manufacturing, and a wide variety of other organizational functions. In the illustrated example, three different host applications 350, 352, 354 are running on the host server, e.g., in different containers or virtual machines. Host application 350 is a diamond-level application that uses application image 50 (FIG. 1). Host application 352 is a gold-level application that uses application image 52 (FIG. 1). Host application 354 is a bronze-level application that uses application image 54 (FIG. 1). The MPIO driver 310 discovers storage objects associated with the application images that are maintained and presented on separate sets of ports by the storage array. Logical host devices 250, 252, 254 are representations of application images 50, 52, 54, respectively, that are created locally on the server for access by the host application instances. The instances of the host applications use the logical host devices for data access, e.g., to read and write host application data to logical block addresses (LBAs). Corresponding IOs 316, 318 are generated and sent to the storage array via the MPIO driver and HBA ports to access the application image storage objects to read and write data. More specifically, the MPIO driver selects from among multiple port-defined paths that are available to access the application image, if they exist, in order to balance IO loading across the paths via which the application image is accessible. Each IO is sent to the storage array via the host server and storage array ports corresponding to the selected path. Configuration files 312 maintained by the host server include metadata that describes the paths supported by the host server. For example, the port IDs and authentication credentials for each supported path are included in the configuration files, which may be persistently stored in storage and copied into memory for low latency access during operation. The HBA includes components such as IO chips that monitor link errors and IO failures such as missing frames, timeouts, and received aborts.

Figure 3:
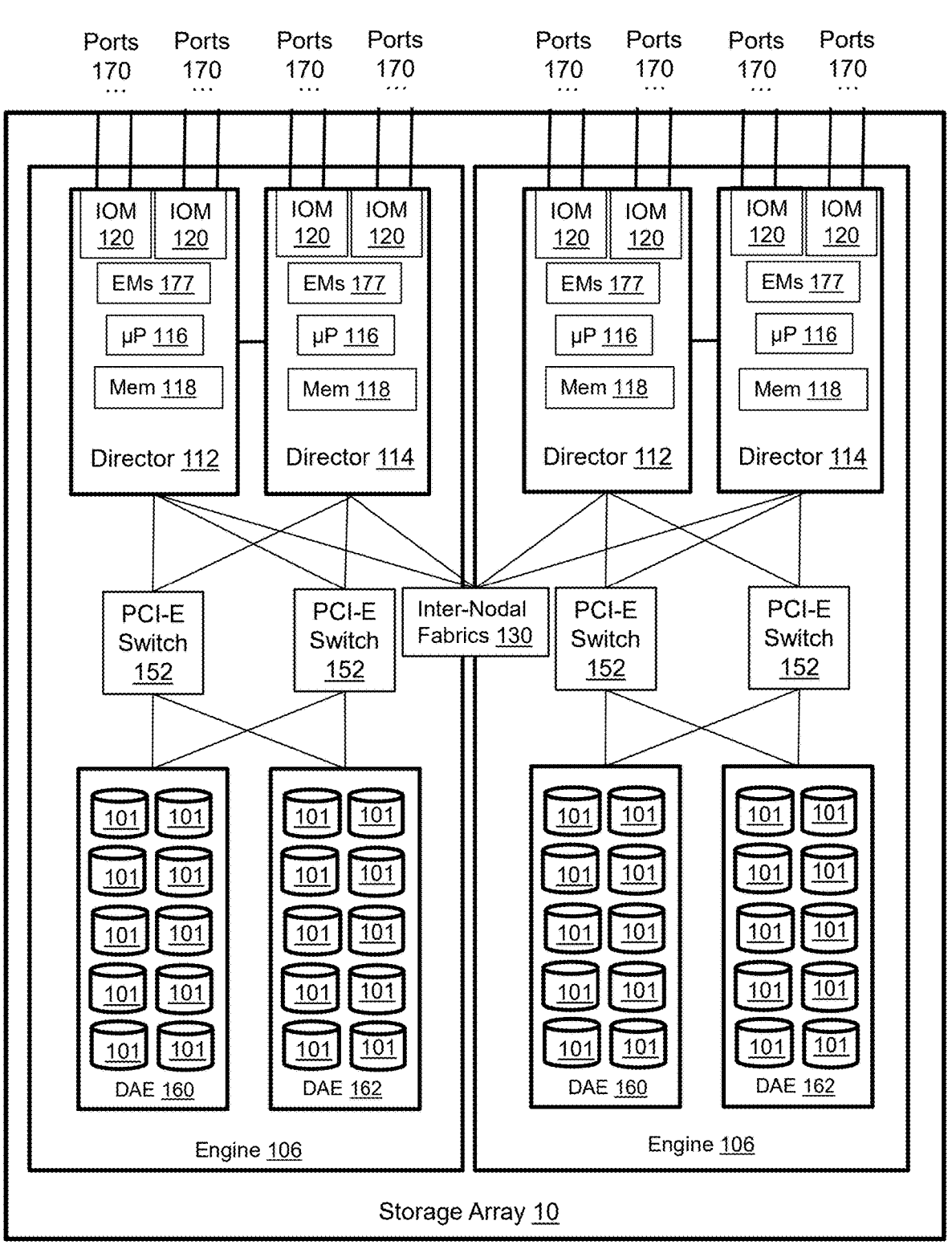
FIG. 3 illustrates a storage array in greater detail.

FIG. 3 illustrates storage array 10 in greater detail. The storage array includes two engines 106, although there may be any number of engines. Each engine includes disk array enclosures (DAEs) 160, 162 and a pair of specialized, peripheral component interconnect express (PCI-E) interconnected compute nodes known as storage directors 112, 114 that are in a failover relationship. Within each engine, the storage directors and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each storage director is implemented on a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each storage director allocates a portion of its local memory 118 to a shared memory that can be accessed by all storage directors of the storage array. Each storage director includes one or more IO modules (IOMs) 120 with front-end ports 170 for communicating with host servers. Each storage director also includes one or more adapters for communicating with other storage directors via point-to-point links or redundant inter-nodal channel-based InfiniBand fabrics 130.

Each storage director 112, 114 runs emulations (EMs 177) that perform different storage-related tasks and functions. Front-end emulations handle communications with the host servers. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. One or more of the emulations may be configured to implement port oversubscription.

Figure 4:
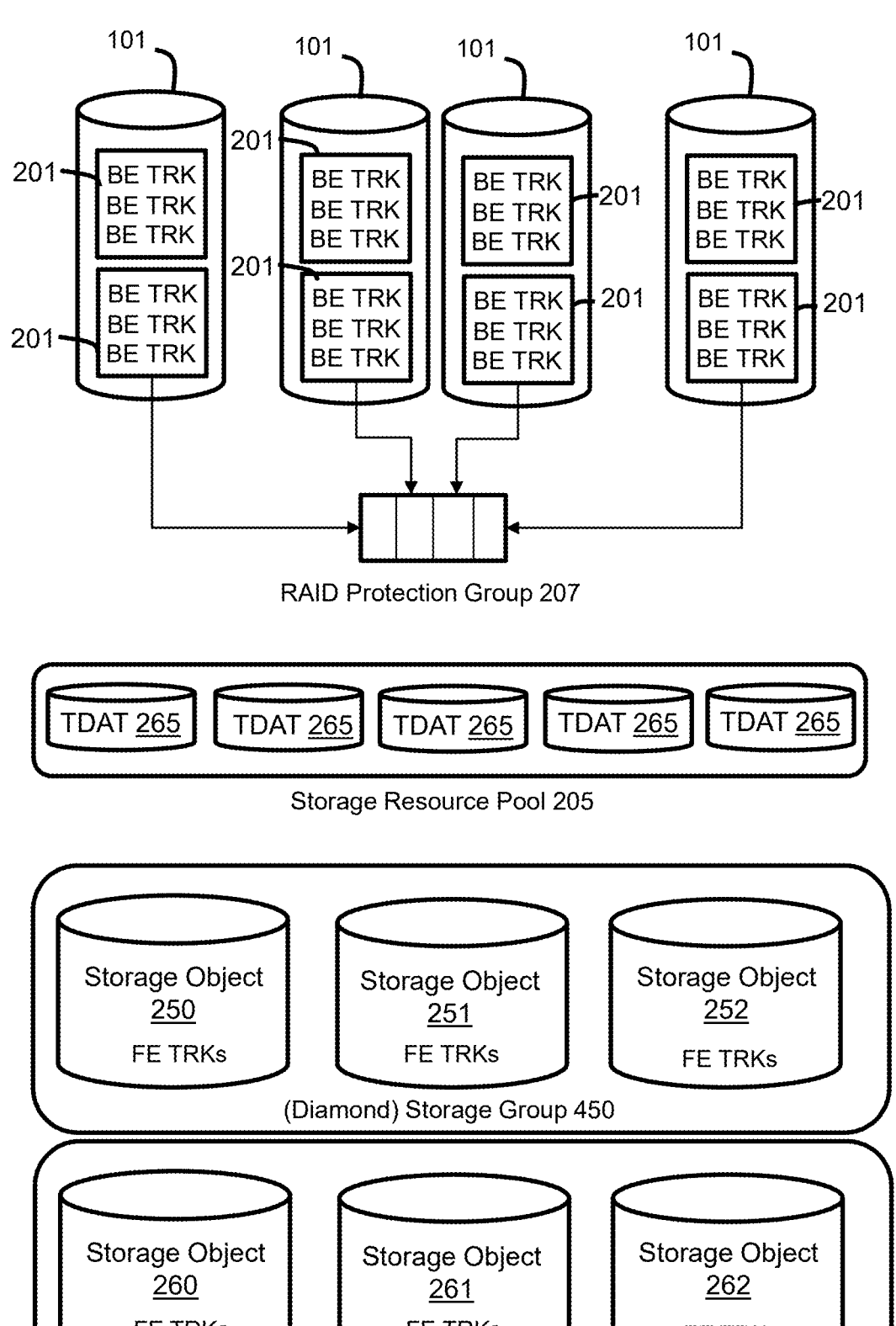
FIG. 4 illustrates the organization of storage-based service levels.

FIG. 4 illustrates the organization of storage-based service levels. The managed drives 101 are not discoverable by the host servers, so the storage array creates logical production storage objects 250, 251, 252, 260, 261, 262 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers, each production storage object is a single disk drive having a set of contiguous fixed-size logical block addresses (LBAs) on which data used by the instances of one of the host applications resides. However, the host application data is stored at non-contiguous addresses distributed across multiple managed drives 101.

The storage director emulations maintain metadata that maps between the LBAs of the production storage objects and physical addresses on the managed drives in order to process IOs from the host servers. The basic allocation unit of storage capacity that is used by the storage directors 112, 114 to access the managed drives 101 is a back-end track (BE TRK). The managed drives are organized into same-size splits 201, each of which may contain multiple BE TRKs. A grouping of splits 201 from different managed drives 101 is used to create a RAID protection group 207 with each split containing a protection group member. A storage resource pool 205 is a type of storage object that includes a collection of protection groups of the same RAID level, e.g., RAID-5 (3+1), on thinly provisioned logical data devices (TDATs) 265 that are used to create the production storage objects. The host application data is logically stored in front-end tracks (FE TRKs) on the production storage objects. The FE TRKs of the production storage objects are mapped to the BE TRKs on the managed drives and vice versa by tables and pointers that are maintained in the shared memory.

A collection of production storage objects associated with a single host application is known as a storage group. In the illustrated example, storage group 450 includes production storage objects 250, 251, 252 that contain host application image 50 (FIG. 1). Storage group 452 includes production storage objects 260, 261, 262 that contain host application image 52 (FIG. 1). A different storage group (not illustrated) would contain host application image 54 (FIG. 1). Multiple instances of a single host application may use the same storage group, but instances of different host applications do not use the same storage group. The storage array may maintain any number of storage groups, e.g., one per supported host application. Each storage group is associated with the performance-defining service level of the associated host application. Different host applications have different requirements in terms of maximum acceptable data access latency. Within the storage array, each service level may be defined by a target data access latency measured from receipt of an IO from a host to transmission of data or an acknowledgement to the host in response to the IO. The target data access latency is typically less than the maximum acceptable data access latency for the host application. The service level associated with a storage group may be selected based on the requirements or performance goals of the host application that uses the storage group. Multiple storage groups may be associated with the same service level.

Figures 5A, 5B:
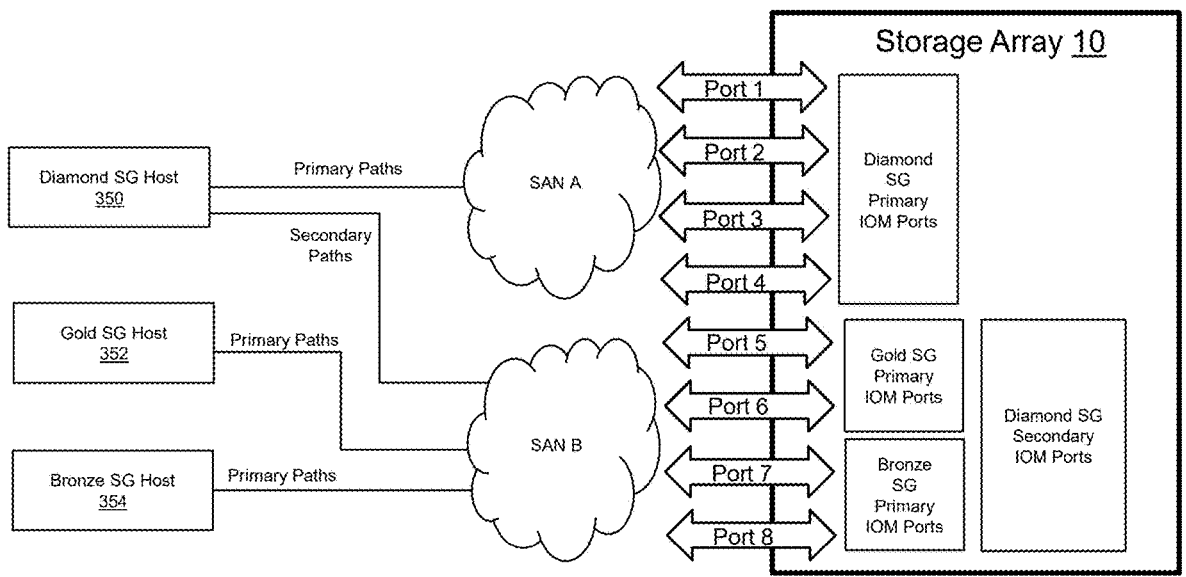
FIG. 5A illustrates port oversubscription paths.
FIG. 5B illustrates oversubscription service level port mappings and bandwidth budgets.

FIG. 5A illustrates port oversubscription paths. Gold storage group host application 352 is masked to front-end IOM ports 5-6 of storage array 10. Specifically, ports 5 and 6 are configured as primary path ports for host application 352. Bronze storage group host application 354 is masked to front-end IOM ports 7-8 of storage array 10. Specifically, ports 7 and 8 are configured as primary path ports for host application 354. Diamond storage group host application 350 is masked to front-end IOM ports 1-8 of storage array 10. Specifically, ports 1-4 are configured as primary path ports for host application 350 and ports 5-8 are configured as secondary path ports for host application 350. Primary path ports are always active. The secondary path ports are only active when oversubscription is enabled. When oversubscription is disabled, diamond storage group host 350 is allocated 100% of the bandwidth of ports 1-4 and 0% of the bandwidth of ports 5-8. Also, when oversubscription is disabled, gold storage group host 352 is allocated 100% of the bandwidth of ports 5-6 and bronze storage group host 354 is allocated 100% of the bandwidth of ports 7-8. As will be explained below, ports 5-8 are shared when oversubscription is enabled.

FIG. 5B illustrates oversubscription service level port mappings and bandwidth budgets. When oversubscription is enabled, diamond storage group host 350 is still allocated 100% of the bandwidth of ports 1-4 and temporarily gains 25% of the bandwidth of ports 5-6 and 50% of the bandwidth of ports 7-8. In order to provide the oversubscription bandwidth to the diamond storage group host, the gold storage group host is limited to 75% of the bandwidth of ports 5-6 and the bronze storage group host is limited to 50% of the bandwidth of ports 7-8. In other words, predetermined percentages of port bandwidth are temporarily transferred from donating storage group hosts to the oversubscription-protected storage group host. This may be implemented by setting bandwidth limits for storage groups. The illustrated percentages are merely exemplary and not to be viewed as limiting.

Figure 6A:
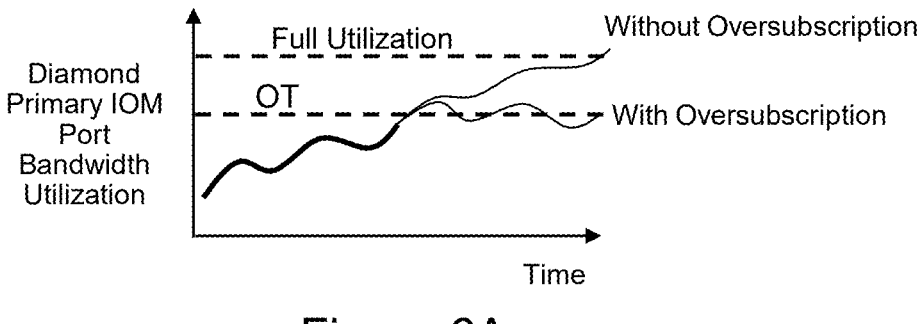
FIGS. 6A, 6B, and 6C illustrate dynamic triggering of port oversubscription based on observed current port bandwidth utilization.
Figure 6B:
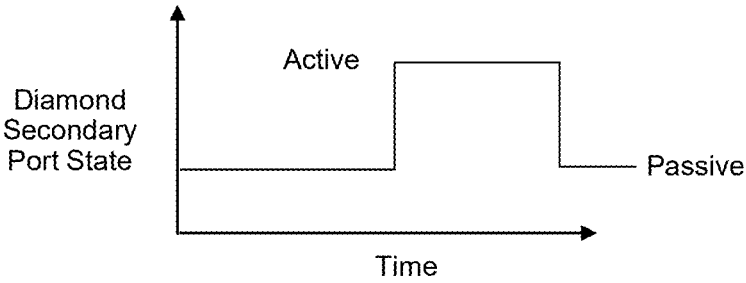
Figure 6C:
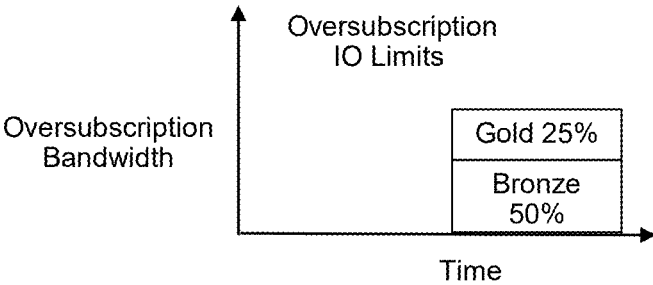

FIGS. 6A, 6B, and 6C illustrate dynamic triggering of port oversubscription based on observed current port bandwidth utilization. Aggregate diamond primary IOM port bandwidth utilization varies between 0 and full utilization. An oversubscription-triggering threshold (OT) is set relative to full utilization of all primary path ports of the oversubscription-protected storage group, e.g., at 95% of full utilization. When current observed utilization of the primary path ports masked to an oversubscription-protected storage group reaches the OT, the state of the secondary path ports associated with that storage group are updated from passive (inactive) to active. The state change is signaled from the storage array to the host servers using ALUA messages. The predetermined amounts of oversubscription bandwidth are then temporarily allocated to the oversubscription-protected storage group by setting bandwidth limits for storage groups. This may potentially prevent utilization of the primary path ports masked to the oversubscription-protected storage group from reaching full utilization. After a predetermined period of time in the active state, or after a predetermined period of time in the active state combined with a condition such as current oversubscription-protected storage group primary path utilization below the OT, the state of the secondary path ports associated with the oversubscription-protected storage group is updated from active to passive. The state change is signaled to the host servers using ALUA messages. The temporarily transferred amounts of oversubscription bandwidth are then restored to the donor storage groups by removing the bandwidth limits.

Figure 7:
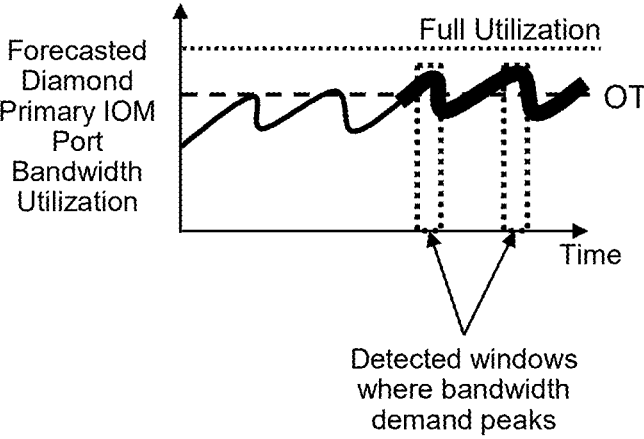
FIG. 7 illustrates triggering of port oversubscription based on forecasted port bandwidth utilization.

FIG. 7 illustrates triggering of port oversubscription based on forecasted port bandwidth utilization. Time-series forecasting, or some other technique, is used to predict utilization of the primary path ports masked to the oversubscription-protected storage group. In windows in which forecasted utilization of the primary path ports masked to the oversubscription-protected storage group are predicted to reach the OT, the state of the secondary path ports associated with that storage group are updated from passive to active. The state change is signaled from the storage array to the host servers using ALUA messages. The limited amounts of oversubscription bandwidth are then temporarily allocated to the oversubscription-protected storage group by setting bandwidth limits. This may potentially prevent utilization of the primary path ports masked to the oversubscription-protected storage group from reaching full utilization. At the close of the window the state of the secondary path ports associated with the oversubscription-protected storage group are updated from active to passive. The state change is signaled to the host servers using ALUA messages. The limited amounts of oversubscription bandwidth are then restored to the donor storage groups by removing the bandwidth limits.

Although oversubscription has been described as being time-limited, it could be implemented in a persistent manner. For example, the secondary paths could remain active unless manually updated to be passive. Bandwidth limits could be set so as to decrease the likelihood of lowering-performing storage groups failing to meet their data access latency targets.

Figure 8:
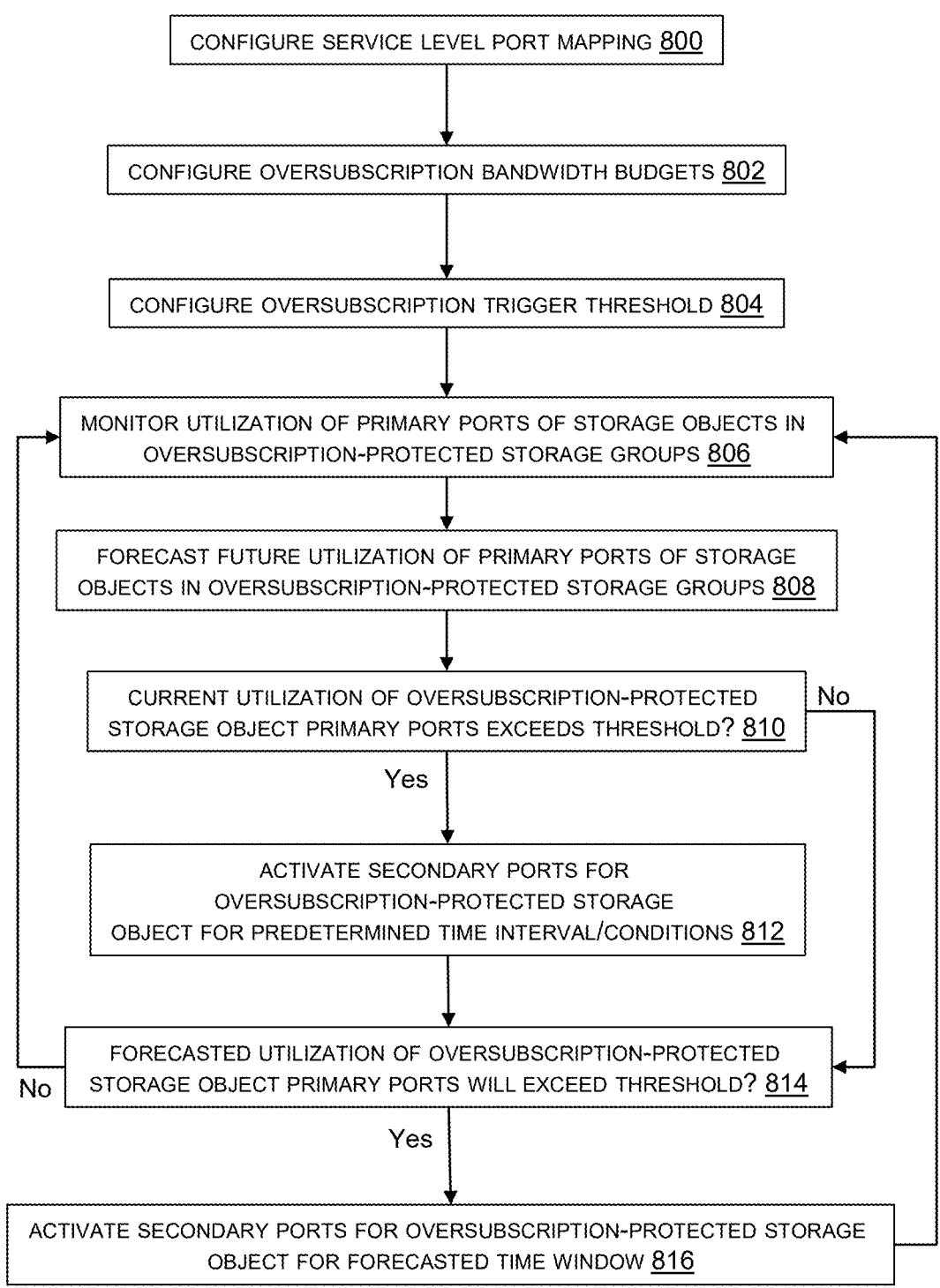
FIG. 8 illustrates a method of service level port oversubscription.

FIG. 8 illustrates a method of service level port oversubscription. Step 800 is configuring the service level port mappings. Each storage group is masked to one or more front-end IOM ports. Oversubscription-protected storage groups are mapped to primary path ports and secondary path ports. Non-protected storage groups are only mapped to primary path ports. The secondary path ports may all be primary path ports of non-protected storage groups. Step 802 is configuring oversubscription bandwidth budgets. The amount of increased bandwidth available to the oversubscription-protected storage group from activated secondary ports, and thus the amount of decreased bandwidth available to the non-protected storage groups for which those are primary ports, are set at values that sum to 100% of the bandwidth limit of those ports, e.g., 25% for activated secondary paths and 75% for donating primary paths. Different bandwidth budgets may be set for each non-protected storage group, e.g., relative to tolerance for increased latency or decreased throughput. Step 804 is configuring the oversubscription trigger threshold. The threshold may be set as a percentage of aggregate bandwidth of the primary ports of the oversubscription-protected storage group.

The configurations are used to manage and implement port oversubscription. Step 806 is monitoring utilization of primary ports masked to storage objects in oversubscription-protected storage groups. In step 808, primary port utilization of storage objects in oversubscription-protected storage groups is forecasted. Utilization may be tracked and forecast on a per-storage object or per-storage group basis. Time-series forecasting, or other techniques may be used. If current utilization of the primary ports masked to a storage object of an oversubscription-protected storage group exceeds the trigger threshold as determined in step 810, then the secondary ports for that storage object are activated in step 812. Otherwise, flow proceeds to step 814. The secondary ports may be activated for a predetermined time interval, until predetermined conditions are met, e.g., utilization relative to the trigger threshold, or both. Step 814 is determining whether the forecasted utilization of primary ports masked to an oversubscription-protected storage group exceeds the trigger threshold. If not, then the flow returns to step 806. If so, then step 816 is activating the secondary ports for that storage object during the time windows in which utilization of the primary ports is forecasted to exceed the trigger threshold.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
configuring port mappings that mask each of a plurality of performance-differentiated storage groups to a different set of front-end ports of a storage system, including mapping an oversubscription-protected storage group to primary path ports and secondary path ports and mapping a non-protected storage group to only the primary path ports, the mapped ports including at least one oversubscription port that is in a primary path of the non-protected storage group and in a secondary path of the oversubscription-protected storage group;
monitoring aggregate utilization of the primary path ports mapped to the oversubscription-protected storage group while the secondary path ports, including the oversubscription port, are in an inactive state such that the oversubscription port is not usable to access the oversubscription-protected storage group and is usable to access the non-protected storage group; and
responsive to aggregate utilization of the primary path ports mapped to the oversubscription-protected storage group satisfying a trigger condition, switching the secondary path ports, including the oversubscription port, from the inactive state to an active state such that the oversubscription port is usable to access the oversubscription-protected storage group and the non-protected storage group.

2. The method of claim 1 further comprising limiting utilization of the active state oversubscription port by the oversubscription-protected storage group to a first bandwidth value.

3. The method of claim 2 further comprising reducing utilization of the active state oversubscription port by the non-protected storage group by the first bandwidth value.

4. The method of claim 3 further comprising switching the secondary path ports, including the oversubscription port, from the active state to the inactive state after a predetermined period of time.

5. The method of claim 4 further comprising switching the secondary path ports, including the oversubscription port, from the active state to the inactive state after the predetermined period of time in combination with satisfaction of a condition.

6. The method of claim 5 further comprising forecasting aggregate utilization of the primary path ports mapped to the oversubscription-protected storage group.

7. The method of claim 6 further comprising, responsive to forecasted aggregate utilization of the primary path ports mapped to the oversubscription-protected storage group satisfying a trigger condition in a future time window, switching the secondary path ports, including the oversubscription port, from the inactive state to the active state for that time window.

8. An apparatus comprising:
a plurality of storage directors that manage access to data stored on a plurality of managed drives used to create a plurality of performance-differentiated storage groups;
port mappings that mask each performance-differentiated storage group to a different set of front-end ports of the storage directors, including mapping an oversubscription-protected storage group to primary path ports and secondary path ports and mapping a non-protected storage group to only the primary path ports, the mapped ports including at least one oversubscription port that is in a primary path of the non-protected storage group and in a secondary path of the oversubscription-protected storage group;
the storage directors configured to:
monitor aggregate utilization of the primary path ports mapped to the oversubscription-protected storage group while the secondary path ports, including the oversubscription port, are in an inactive state such that the oversubscription port is not usable to access the oversubscription-protected storage group and is usable to access the non-protected storage group; and
responsive to aggregate utilization of the primary path ports mapped to the oversubscription-protected storage group satisfying a trigger condition, switch the secondary path ports, including the oversubscription port, from the inactive state to an active state such that the oversubscription port is usable to access the oversubscription-protected storage group and the non-protected storage group.

9. The apparatus of claim 8 further comprising the storage directors configured to limit utilization of the active state oversubscription port by the oversubscription-protected storage group to a first bandwidth value.

10. The apparatus of claim 9 further comprising the storage directors configured to reduce utilization of the active state oversubscription port by the non-protected storage group by the first bandwidth value.

11. The apparatus of claim 10 further comprising the storage directors configured to switch the secondary path ports, including the oversubscription port, from the active state to the inactive state after a predetermined period of time.

12. The apparatus of claim 11 further comprising the storage directors configured to switch the secondary path ports, including the oversubscription port, from the active state to the inactive state after the predetermined period of time in combination with satisfaction of a condition.

13. The apparatus of claim 12 further comprising the storage directors configured to forecast aggregate utilization of the primary path ports mapped to the oversubscription-protected storage group.

14. The apparatus of claim 13 further comprising the storage directors configured, responsive to forecasted aggregate utilization of the primary path ports mapped to the oversubscription-protected storage group satisfying a trigger condition in a future time window, to switch the secondary path ports, including the oversubscription port, from the inactive state to the active state for that time window.

15. A non-transitory computer-readable storage medium storing instructions that are executed by a storage array to perform a method comprising:
configuring port mappings that mask each of a plurality of performance-differentiated storage groups to a different set of front-end ports of a storage system, including mapping an oversubscription-protected storage group to primary path ports and secondary path ports and mapping a non-protected storage group to only the primary path ports, the mapped ports including at least one oversubscription port that is in a primary path of the non-protected storage group and in a secondary path of the oversubscription-protected storage group;

monitoring aggregate utilization of the primary path ports mapped to the oversubscription-protected storage group while the secondary path ports, including the oversubscription port, are in an inactive state such that the oversubscription port is not usable to access the oversubscription-protected storage group and is usable to access the non-protected storage group; and responsive to aggregate utilization of the primary path ports mapped to the oversubscription-protected storage group satisfying a trigger condition, switching the secondary path ports, including the oversubscription port, from the inactive state to an active state such that the oversubscription port is usable to access the oversubscription-protected storage group and the non-protected storage group.

16. The non-transitory computer-readable storage medium of claim 15 in which the method further comprises limiting utilization of the active state oversubscription port by the oversubscription-protected storage group to a first bandwidth value.

17. The non-transitory computer-readable storage medium of claim 16 in which the method further comprises reducing utilization of the active state oversubscription port by the non-protected storage group by the first bandwidth value.

18. The non-transitory computer-readable storage medium of claim 17 in which the method further comprises switching the secondary path ports, including the oversubscription port, from the active state to the inactive state after a predetermined period of time.

19. The non-transitory computer-readable storage medium of claim 18 in which the method further comprises switching the secondary path ports, including the oversubscription port, from the active state to the inactive state after the predetermined period of time in combination with satisfaction of a condition.

20. The non-transitory computer-readable storage medium of claim 19 in which the method further comprises forecasting aggregate utilization of the primary path ports mapped to the oversubscription-protected storage group and, responsive to forecasted aggregate utilization of the primary path ports mapped to the oversubscription-protected storage group satisfying a trigger condition in a future time window, switching the secondary path ports, including the oversubscription port, from the inactive state to the active state for that time window.

* * * * *